No. 682,662. Patented Sept. 17, 1901.
S. BARTHOLOMEW.
PIANO TRUCK.
(Application filed Dec. 10, 1900.)
(No Model.)
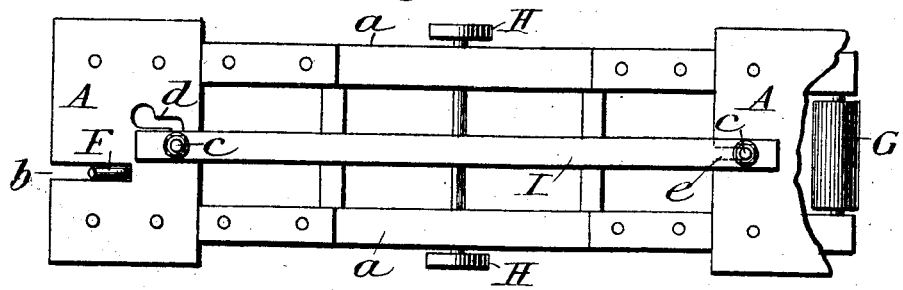
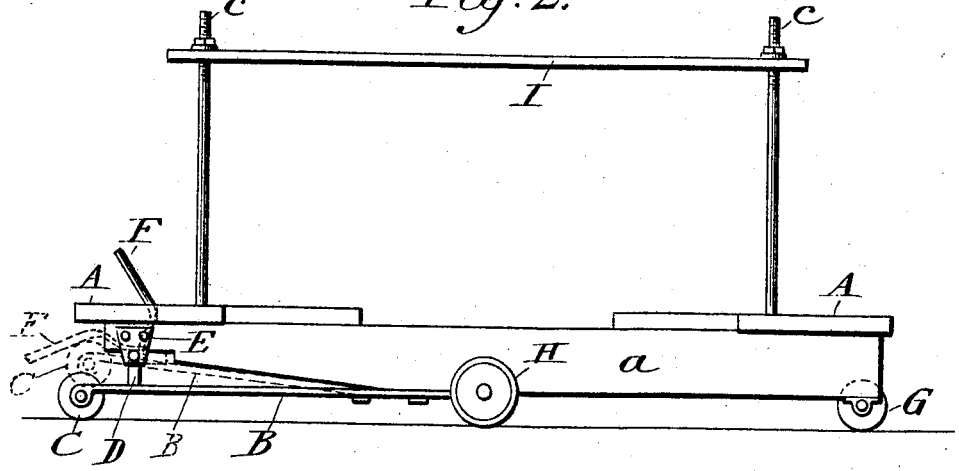
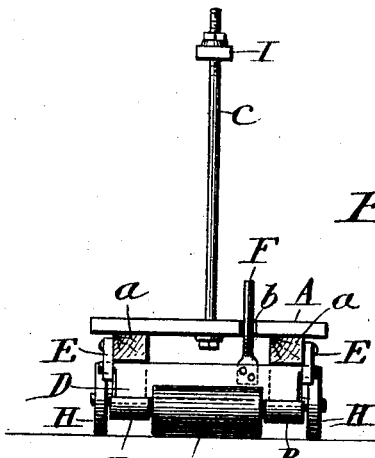

UNITED STATES PATENT OFFICE.

SETH BARTHOLOMEW, OF STURGIS, MICHIGAN.

PIANO-TRUCK.

SPECIFICATION forming part of Letters Patent No. 682,662, dated September 17, 1901.

Application filed December 10, 1900. Serial No. 39,279. (No model.)

*To all whom it may concern:*

Be it known that I, SETH BARTHOLOMEW, a citizen of the United States, residing at Sturgis, in the county of St. Joseph and State of Michigan, have invented new and useful Improvements in Piano-Trucks, of which the following is a specification.

My invention relates to improvements in piano-trucks in which an end roller is raised or depressed and vertical rods engage a crossbar; and the object of my invention is to provide a simple method, first, whereby the truck may be moved in any direction, and, second, whereby the piano can be effectually secured to the truck.

I attain this object by the mechanism illustrated in the accompanying drawings, forming a part of this specification, in which—

Figure 1 is a plan view of a piano-truck. Fig. 2 is a side elevation thereof, showing my device. Fig. 3 is a detail view of my device.

Similar letters refer to similar parts in all the views.

A is the bed-frame of a piano-truck. B represents steel spring-plates bolted beneath the side pieces a of frame A and turned at their exterior ends, forming journals in which a roller C revolves. A rectangular bar D, pivoted at both ends, rotates in journals E, secured beneath the frame A, and has a lever F thereto attached operating through the slot b in the frame A, by which it actuates the springs B for the purpose of lowering and raising the roller C. The side pieces a of the frame A are chamfered off toward the outer ends to permit the spring-plates B to lie close thereto, and thus raise the roller C, and a square notch is cut into the extreme outer ends of a to receive the ends of the bar D when turned to a horizontal position for the same purpose. The frame A is supported at each end by rollers C and G, respectively, and also by a pair of wheels H, journaled in the center of side pieces a. When the bar D is turned to a vertical position, it pushes down the spring-plates B and places the bottom of roller C on the same plane with that of H and G. Two rods c pass through the frame A by the slots d and e and are furnished with nuts and washers at both ends and pass through a cross-bar I, designed to rest on the top of the piano, securing it to the truck.

In operating the device after the piano is placed on the truck the rods c are set in the slots d and e. The cross-bar I is put on top of the piano, the rods c passing through openings therein. The nuts and washers are then screwed thereon. The bar D being set in a vertical position pushes down the spring-plates B, placing the bottom of the rollers C on the same plane with that of the roller G and the wheels H. The truck can be now run in a straight line. When it becomes necessary to change direction, the lever F is pressed by the foot, which rotates the bar D into a horizontal position and releases the springs B, which then lie up close to the chamfered surfaces of the side pieces a, thus lifting the roller C and placing the weight of the truck on the central wheels H. The truck can then be readily moved in any desired direction.

Having thus fully described my invention, what I claim as new, and desire to secure by Letters Patent, is—

1. The combination in a piano-truck of two spring-plates journaled at the ends, with a roller revolving therein, all substantially as set forth.

2. In a piano-truck the combination of a couple of spring-plates journaled and having a roller operating in said journals, with a rectangular bar, and a lever attached to said rectangular bar, all substantially as and for the purpose described.

3. The combination in a piano-truck of a couple of rods having nuts and washers with a cross-bar secured to said rods, all substantially as and for the purpose set forth.

SETH BARTHOLOMEW.

Witnesses:
WM. MCLOUGHLIN,
H. L. ANTHONY.